(12) United States Patent
Lamoree et al.

(10) Patent No.: US 7,965,200 B2
(45) Date of Patent: Jun. 21, 2011

(54) INDICATING SYSTEM FOR SECURITY OF SPACES IN AN AIRCRAFT

(75) Inventors: Bret L. Lamoree, Snohomish, WA (US); Mark E. Wentland, Lynnwood, WA (US); James P. Schalla, Edmonds, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 12/059,185

(22) Filed: Mar. 31, 2008

(65) Prior Publication Data

US 2009/0243891 A1  Oct. 1, 2009

(51) Int. Cl.
*G08B 21/00* (2006.01)
(52) U.S. Cl. .......... 340/945; 340/541; 340/691.1; 340/539.22
(58) Field of Classification Search .......... 340/945, 340/541, 691.1, 426.1, 426.24, 426.25, 425.5, 340/539.22
See application file for complete search history.

(56) References Cited

U.S. PATENT DOCUMENTS

| | | | |
|---|---|---|---|
| 4,475,196 A * | 10/1984 | La Zor | 714/46 |
| 4,797,657 A | 1/1989 | Vorzimmer et al. | |
| 5,798,458 A * | 8/1998 | Monroe | 73/587 |
| 6,246,320 B1 | 6/2001 | Monroe | |
| 6,448,907 B1 | 9/2002 | Naclerio | |
| 7,023,349 B2 | 4/2006 | Bergeron | |
| 7,355,508 B2 * | 4/2008 | Mian et al. | 340/426.1 |
| 2003/0071743 A1 * | 4/2003 | Seah et al. | 340/945 |
| 2006/0028328 A1 * | 2/2006 | Cresse | 340/435 |
| 2008/0100450 A1 * | 5/2008 | Ayyagari et al. | 340/572.7 |

* cited by examiner

*Primary Examiner* — George A Bugg
*Assistant Examiner* — Hongmin Fan
(74) *Attorney, Agent, or Firm* — Yee & Associates, P.C.

(57) ABSTRACT

A method and apparatus for managing security of areas in an aircraft. The method is provided for managing aircraft security. A set of sensors associated with a set of secured areas is monitored for an indication of a compromised space within a cabin of the aircraft. In response to receiving a signal from a sensor in the set of sensors identifying a breach, an area for the breach in the cabin is identified to form an identified area. A visual indication device associated with the identified area is identified to form an identified visual indication device. A presentation of an alert on the identified visual indication device is initiated.

19 Claims, 5 Drawing Sheets

INDICATING SYSTEM FOR SECURITY OF SPACES IN AN AIRCRAFT

BACKGROUND INFORMATION

1. Field

The present disclosure relates generally to an aircraft and in particular to a monitoring system for an aircraft. Still more particularly, the present disclosure relates to an indicating system for security of compartments and spaces in an aircraft.

2. Background

Airline procedures may be important to ensure the safety for passengers using air travel. Currently, inspections of the interior of an aircraft may be made to prevent placement of or identify prohibited objects and/or items in an aircraft. The current inspections may be performed to ensure the finding of and/or disposing of these types of objects. Aircraft regularly undergo vigorous inspections each day and while cleaning the aircraft between flights resulting in several man-hours per airplane per day. If any areas appear to be tampered with, a more thorough inspection will then be performed.

These visual inspections may also be performed to ensure that the required minimum equipment is present before flight, for example, that life vests are present in all passenger seats. Any missing equipment may be required to be replaced before flight.

These and other types of inspections may be time consuming and may increase the amount of time needed between flights. These types of inspections may reduce the number of flights possible, as well as requiring increased personnel to perform inspections.

Attempts have been made to make inspections easier to perform. For example, life vests have been put in boxes or compartments with doors. These doors may then be sealed with a tamper evident device. As a result, a visual inspection may be quickly made to determine whether the tamper evident device is intact.

Visually inspecting the spaces, including seat cushions, is labor intensive. This type of inspection increases expense and time to operate flights. Most spaces in an aircraft may not be accessed or tampered with the majority of the time. Seat cushions were not originally designed for these kinds of regular removal and re-installation type inspections. As such, seat cushion components may not withstand this daily activity and may therefore, require more maintenance and replacement, causing significant additional cost to airlines.

Therefore, it would be advantageous to have an improved method and apparatus to overcome the problems described above.

SUMMARY

The advantageous embodiments provide a method and apparatus for managing security of areas in an aircraft. In one advantageous embodiment, the method is provided for managing aircraft security. A set of sensors associated with a set of secured areas is monitored for an indication of a compromised space within a cabin of the aircraft. In response to receiving a signal from a sensor in the set of sensors identifying a breach, an area for the breach in the cabin is identified to form an identified area. A visual indication device associated with the identified area is identified to form an identified visual indication device. A presentation of an alert on the identified visual indication device is initiated.

In another advantageous embodiment, an aircraft security system for identifying a compromised space in an aircraft comprises a sensor network, a display indication network, and a data processing system. The sensor network is capable of monitoring a set of secured areas in a cabin of an aircraft. The display indication device network is in communication with the sensor network and is capable of generating visual alerts within the cabin of the aircraft. The data processing system is capable of monitoring the sensor network for an indication of the compromised space within the set of secured areas; identifying a breach, identifying an area for the breach in the cabin to form an identified area in response to receiving a signal from a sensor in a plurality of sensors, identifying a visual indication device within the display indication device network in which the visual indication device is associated with the identified area to form an identified visual indication device, and initiating a presentation of an alert on the identified visual indication device.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
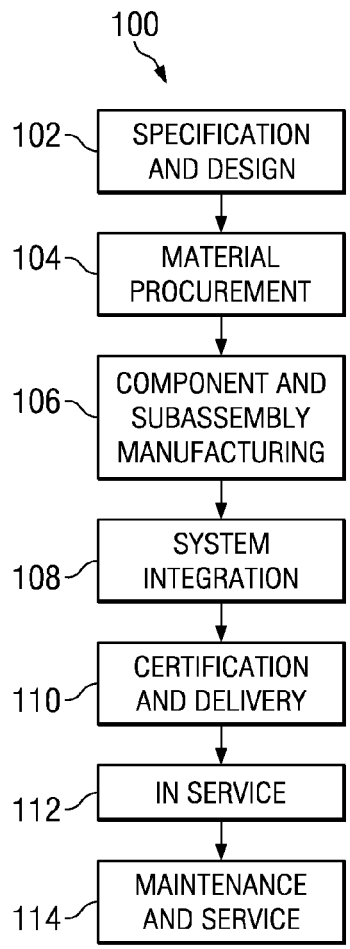
FIG. 1 is a diagram illustrating an aircraft manufacturing and service method in accordance with an advantageous embodiment.
Figure 2:
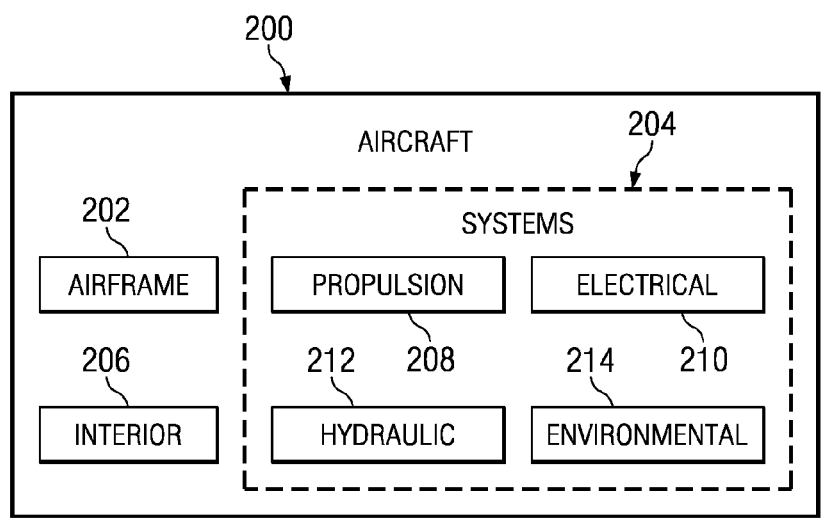
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment.

During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include inspections, modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other mobile and fixed based industries, such as the automotive industry, cruise ship industry, public type buildings requiring limited access to spaces, and other suitable industries.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the initial and/or operating cost of aircraft 200. Similarly, one or more of apparatus embodiments, method embodiments, or a combination thereof may be utilized while aircraft 200 is in service 112 or during maintenance and service 114 in FIG. 1.

Figure 3:
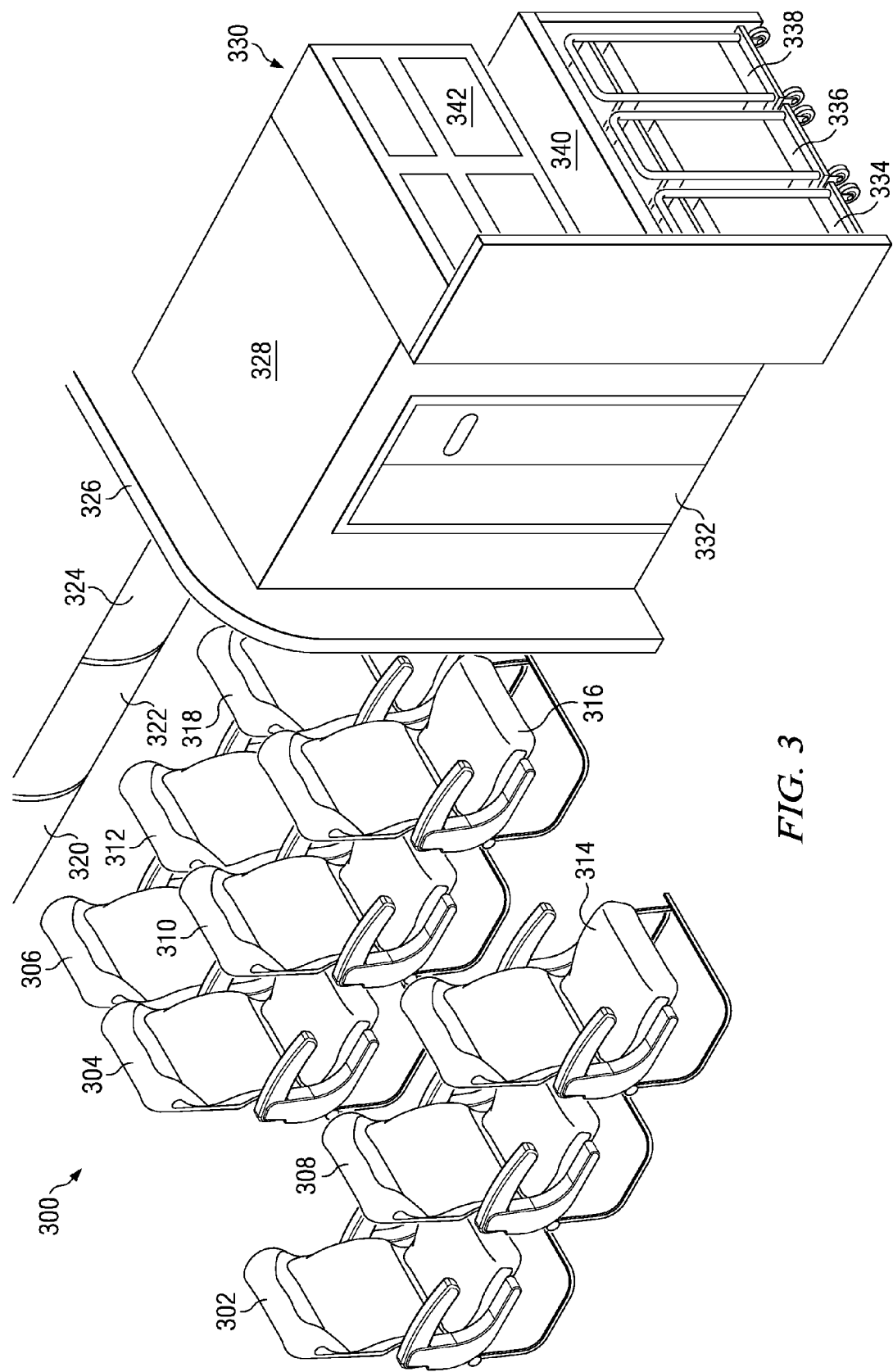
FIG. 3 is a diagram of a passenger cabin in accordance with an advantageous embodiment.

Turning now to FIG. 3, a diagram of a passenger cabin is depicted in accordance with an advantageous embodiment. In this example, passenger cabin 300 may include passenger seating in seating area 302. Passenger seating may include aircraft seats 304, 306, 308, 310, 312, 314, 316, 318, and 320.

Further, seating area 302 in passenger cabin 300 may also include storage areas, such as overhead compartments 322, 324, and 326. Passenger cabin 300 also may include lavatory 328 and galley area 330. These two areas may be partitioned or separated from seating area 302 by a partitioning structure such as, for example, without limitation, wall 332. Lavatory 328 may have door 334, which allows entry into lavatory 328. Further, galley area 330 may include carts 336, 338, and 340, which may be stored under counter 342. Further, galley area 330 also may include cabinets 344. Cabinets 344 may store various items, such as, for example, without limitation, drinks, tableware, plates, cups, napkins, coffee, and other suitable items for galley area 330.

This illustration of passenger cabin 300 for an aircraft is provided for purposes of illustrating one environment in which the different advantageous embodiments may be implemented. The illustration of passenger cabin 300 in FIG. 3 is not meant to imply architectural limitations as to the manner in which different advantageous embodiments may be implemented. For example, other area may be present in addition to passenger seating area 302, lavatory 328, and galley area 330. Other areas may include, for example, without limitation, closets, storage areas, lounges, and other suitable areas for passenger seating.

As another example, aircraft seats within seating area 302 may be arranged differently from the depicted example. In other advantageous embodiments, seats may be grouped into sets of three, four, or five aircraft seats instead of two or single seats as illustrated in seating area 302. The different advantageous embodiments provide emergency equipment systems that may be integrated into aircraft seats, such as those illustrate in FIG. 3.

The different advantageous embodiments recognize that it would be desirable to reduce the amount of inspections that are performed. Currently, inspections may be performed in the cabin of an aircraft and other areas multiple times each day. The different advantageous embodiments recognize that the currently used mechanism for performing inspections requires an inspection of all of the different areas that are required to be secured. These areas include, for example, cabinets in vanities in the lavatory, toilet shrouds in the laboratory, areas behind air grills, pouches in aircraft seats, life vest packages, and other areas of concern.

Thus, the different advantageous embodiments provide a method and apparatus for a security system to identify compromised spaces in an aircraft. The different advantageous embodiments may monitor sensors associated with secured areas in the aircraft cabin for an indication of a compromised space that may have occurred. In response to receiving a signal from the sensor in the sensors, an area with the breach is identified to form an identified area. A visual indication device located in the cabin that is associated with the identified area is located. A presentation of an alert on the identified visual indication device is initiated. In this manner, an identification of breaches within a cabin of an aircraft may be located. Other areas in which sensors do not detect breaches may not be inspected or may be inspected with less frequency.

Figure 4:
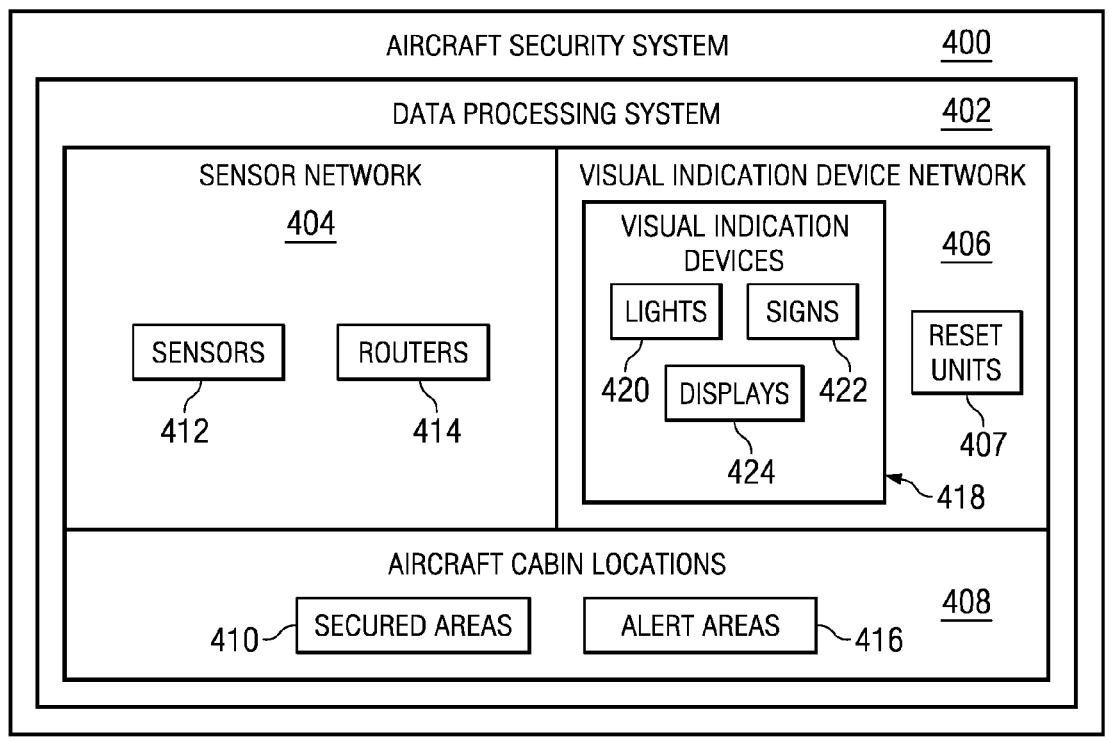
FIG. 4 is an illustration of an aircraft security system in accordance with an advantageous embodiment.

With reference now to FIG. 4, an illustration of an aircraft security system is depicted in accordance with an advantageous embodiment. Aircraft security system 400 may be implemented in passenger cabin 300 in FIG. 3.

In this example, aircraft security system 400 includes data processing system 402, sensor network 404, and visual indication device network 406. Data processing system 402 provides hardware and software needed to monitor a passenger cabin for compromised spaces. Data processing system 402 may be in various locations in the aircraft. For example, data processing system 402 may be located in the passenger cabin, the cockpit, a galley area, or some other suitable location within the aircraft. Sensor network 404 is used to monitor locations within aircraft cabin locations 408. Similarly, this sensor network 404 and visual indication device network 406 could be utilized for compartments, doors, service panel spaces typically accessed from the exterior of the aircraft or other suitable spaces.

In these examples, these locations are secured areas. These areas may include, for example, vanity cabinets, toilet shrouds, compartments in the lavatory, areas behind an air grill, and other suitable areas. In these examples, sensors 412 are placed in and/or monitor secured areas 410. These sensors may route indications of breaches in secured areas 410 to data processing system 402 through routers 414. Routers 414 provide an interconnection between sensors 412 and data processing system 402. In some advantageous embodiments, sensors 412 may be directly connected to data processing system 402.

Visual indication device network 406 provides a presentation or display of an alert in various areas within aircraft cabin locations 408. Alert areas 416 are areas in which visual indication devices 418 may be located. These visual indication devices include, for example, lights 420, signs 422, and displays 424. Lights 420 may be placed in an area within alert areas 416 that is within some distance of the corresponding secured area within secured areas 410.

For example, a light may be placed at the end of a row that is associated with sensors monitoring seats in that row. These sensors may monitor seat cushions and/or life vests. A sign within signs 422 may be, for example, placed outside of a lavatory in association with sensor monitoring various cabinets within the lavatory. Displays 424 may be placed in locations, such as in a crew area or a galley for alert areas 416. Reset units 407 provide a mechanism to reset visual indication devices 418 after an alert has been noticed. Visual indication devices 418 may be reset after the alert has been noticed and/or after an inspection of the appropriate secured area has been performed by authorized airline service personnel.

The alerts may be recorded, but may be suspended by authorized personnel to prevent the annoyance that alerts may cause to passengers during the flight. Aircraft security system 400 may then be commanded to reactivate by an authorized person, or when the system receives some other external signal, such as cabin door being opened. This allows alerts to be presented upon airplane arrival to aide authorized inspectors, service and maintenance personnel to complete their tasks. All system components and/or group of components may be designed to monitor system, sub-system and/or component health.

Figure 5:
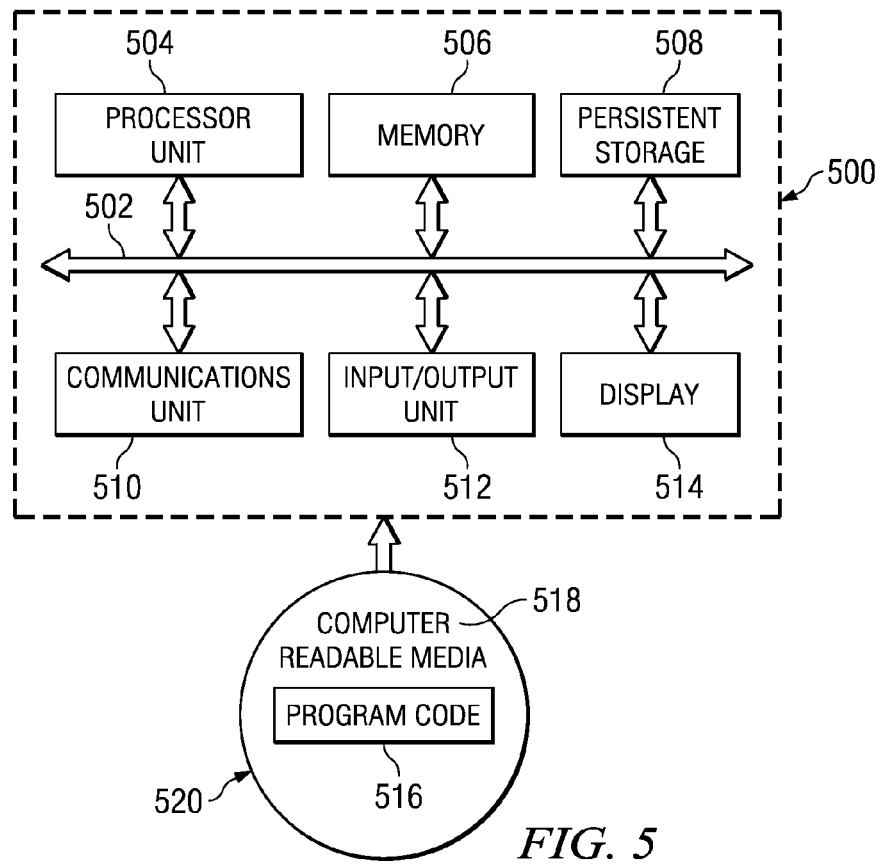
FIG. 5 is a diagram of a data processing system in accordance with an illustrative embodiment.

Turning now to FIG. 5, a diagram of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multiprocessor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices. A storage device is any piece of hardware that is capable of storing information either on a temporary basis and/or a permanent basis. Memory 506, in these examples, may be, for example, a random access memory or any other suitable volatile or non-volatile storage device. Persistent storage 508 may take various forms depending on the particular implementation. For example, persistent storage 508 may contain one or more components or devices.

For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for authorized user input through a keyboard and mouse or other medium. Further, input/output unit 512 may send output to a printer and/or portable memory device. Display 514 provides a mechanism to display information to an authorized user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 516 is located in a functional form on computer readable media 518 that is selectively removable and may be loaded onto or transferred to data processing system 500 for execution by processor unit 504. Program code 516 and computer readable media 518 form computer program product 520 in these examples. In one example, computer readable media 518 may be in a tangible form, such as, for example, an optical or magnetic disc that is inserted or placed into a drive or other device that is part of persistent storage 508 for transfer onto a storage device, such as a hard drive that is part of persistent storage 508.

In a tangible form, computer readable media 518 also may take the form of a persistent storage, such as a hard drive, a thumb drive, or a flash memory that is connected to data processing system 500. The tangible form of computer readable media 518 is also referred to as computer recordable storage media. In some instances, computer readable media 518 may not be removable.

Alternatively, program code 516 may be transferred to data processing system 500 from computer readable media 518 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

As one example, a storage device in data processing system 500 is any hardware apparatus that may store data. Memory 506, persistent storage 508 and computer readable media 518 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

Figure 6:
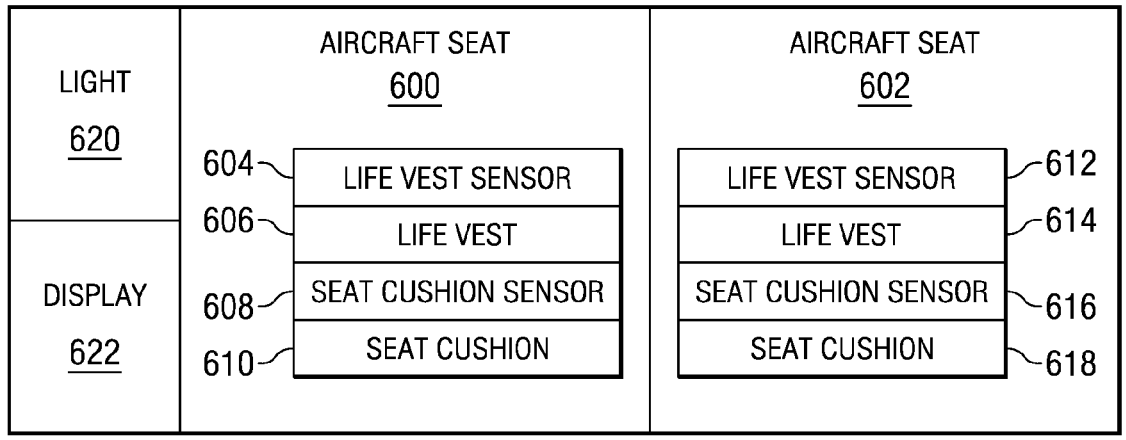
FIG. 6 is a block diagram illustrating an indication system for aircraft seats in accordance with an advantageous embodiment.

With reference now to FIG. 6, a block diagram illustrating an indication system for aircraft seats is depicted in accordance with an advantageous embodiment. In this example, aircraft seat 600 and aircraft seat 602 are considered secured areas, such as those found in secured areas 410 in FIG. 4. In these examples, life vest sensor 604 monitors life vest 606, and seat cushion sensor 608 monitors seat cushion 610. In a similar fashion, life vest sensor 612 monitors life vest 614, and seat cushion sensor 616 monitors seat cushion 618. If tampering or a removal of life vest 606 is detected by life vest sensor 604, an indication of the breach of this secured area may be made using light 620.

A breach of seat cushion 610 detected by seat cushion sensor 608 also may be indicated through light 620. In similar fashion, a breach of life vest 614 and/or seat cushion 618 detected by life vest sensor 612 and seat cushion sensor 616 also may be indicated through light 620. In these examples, light 620 is attached to aircraft seat 600 and may be used to identify breach locations for aircraft seat 600 and aircraft seat 602. The particular seat and the particular component within the seat which a breach has occurred may be identified based on various types of indications that may be made though light 620.

For example, a series of flashes may be used to identify the particular seat and/or component. Further, a color may be used to identify the particular component, while a series of flashes identifies a particular seat. For example, a blue light may identify a life vest while a red light may identify a seat cushion. One flash may indicate aircraft seat 600, while two flashes may indicate aircraft seat 602. Of course, these types of indicators and other combination of flashes and/or colors may be used to identify more precisely the location of the breach.

In addition to or alternately, display 622 may be used to identify the location of the breach. When display 622 is used, display 622 may present information, such as, for example, without limitation, a seat number, a row number, an identification of the component for which a breach has been detected and the date/time in which the breach may have occurred.

Figure 7:
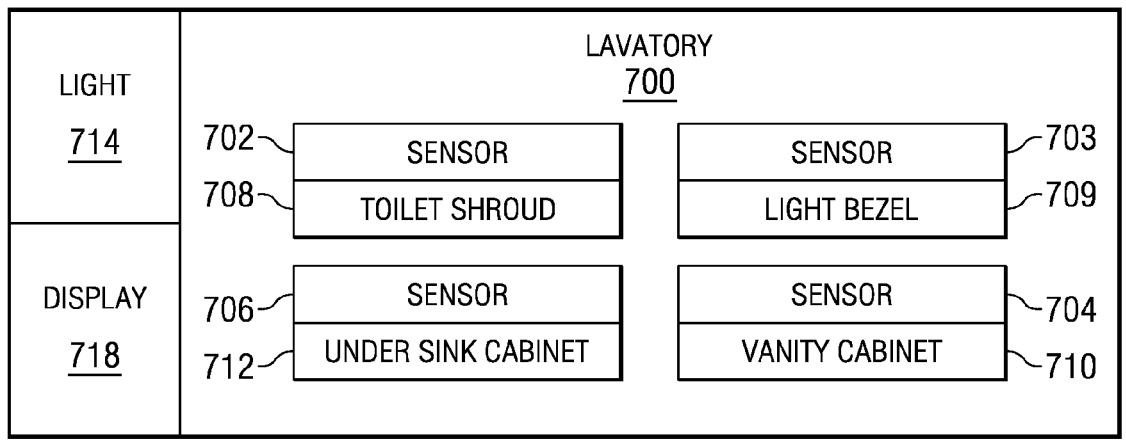
FIG. 7 is a block diagram of a compromised space indication system in accordance with an advantageous embodiment.

Turning now to FIG. 7, a block diagram of a compromised space indication system is depicted in accordance with an advantageous embodiment. In this example, lavatory 700 may include sensors 702, 703, 704, and 706. These sensors monitor secured areas, such as toilet shroud 708, light bezel 709, vanity cabinet 710, and under sink cabinet 712. If a breach of one of these secured areas is detected, an alert may be presented using light 714 and/or display 718.

Light 714 may be located outside of lavatory 700 and may use a series of flashes and/or color to identify whether a breach of a secured area within lavatory 700 has occurred. The series of flashes and/or color also may be used to identify a particular secure area within lavatory 700 that may have been breached. Display 718 may be located outside of lavatory 700 in another area, such as, for example, a crew area and/or galley. Display 718 may present information, such as an identification of the lavatory, the item in which a breach may have occurred and the date/time in which the breach may have occurred.

FIGS. 6 and 7 have been presented as illustrative examples of different configurations of sensors and indicators that may be used to monitor for and present alerts when a breach of a secured area has occurred. These examples are not meant to imply limitations on how different sensors and indicators may be implemented within an aircraft.

Other types of visual indication devices may be used, such as, for example, without limitation, pop up flags, strobe lights, text messages, vibration signals, ring/chime tones, recorded messages, and an airplane to ground message to permit ground crew to prepare for the required level of inspection and possible required replacement equipment.

Further, secured areas may include other secured areas in addition to or in place of those shown in these examples. For example, other secured areas may include areas behind grills, closets, spaces behind removal panels, doghouses, crew stowage bins, emergency equipment stowage compartments, maintenance accesses, and other areas in which access, tampering, and/or entry is undesired.

Figure 8:
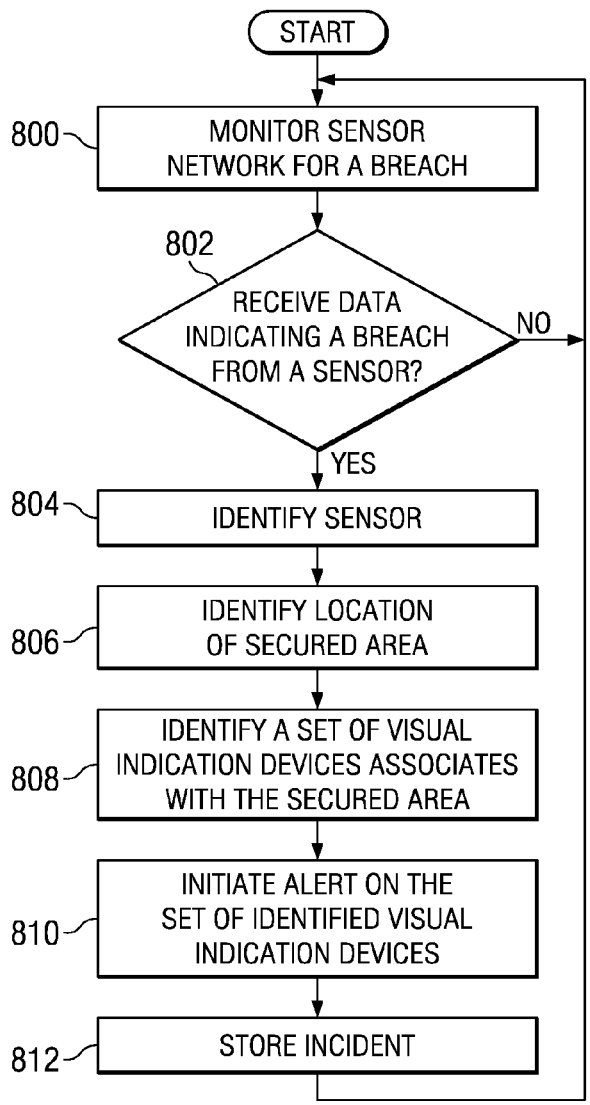
FIG. 8 is a flowchart of a process for generating indications of compromised spaces in accordance with an advantageous embodiment.

With reference now to FIG. 8, a flowchart of a process for generating indications of compromised spaces is depicted in accordance with an advantageous embodiment. The process illustrated in FIG. 8 may be implemented in a data processing system, such as data processing system 402 in FIG. 4.

The process begins by monitoring the sensor network for a breach (operation 800). Thereafter, the process determines whether data has been received indicating a breach from a sensor in a sensor network (operation 802). If data is not received, the process returns to operation 800 to continue to monitor for breaches. If data has been received indicating a breach, the sensor is identified (operation 804). In these examples, the data may include an identifier of the sensor. This identification may be, for example, a serial number, an alpha numeric identifier, or some other identification. The process then identifies a location of the secured area based on the identification of the sensor (operation 806).

In these examples, the location of the secured area may be identified by checking a data structure, such as a table or database containing associations of sensors with locations. The process identifies a set of visual indication devices associated with the secured area (operation 808). This identification may be made by referring to a data structure containing associations between secured areas and visual indication devices. The set of devices may be one or more devices.

In some cases, the indication may be presented both in an area approximate or close to the secured area as well as on another location, such as, for example, a cockpit, crew area, or some other suitable location. The process then initiates the presentation of an alert on the set of identified visual indication devices (operation 810).

As described above, these alerts may take various forms. The alerts may be a series of flashes, color, text on a panel, or some other visual indication. The process stores the incident (operation 812). In these examples, the incident may include an identification of the secured area and a date and/or time at which the breach was detected. The process then returns to operation 800 as described above.

Figure 9:
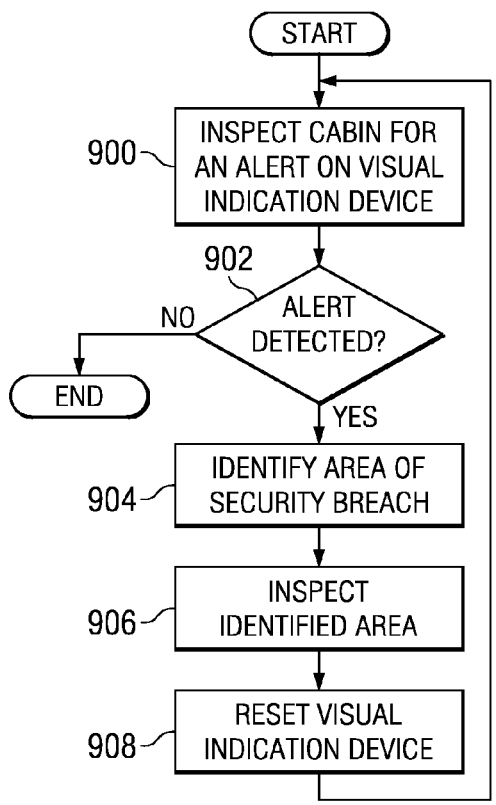
FIG. 9 is a flowchart of a process for performing inspections in accordance with an advantageous embodiment.

Turning now to FIG. 9, a flowchart of a process for performing inspections is depicted in accordance with an advantageous embodiment. The process illustrated in FIG. 9 may be performed in an aircraft.

The process begins by inspecting a cabin for an alert being presented on a visual indication device (operation 900). A determination is made as to whether an alert has been detected (operation 902). If an alert is identified on a visual indication device, the area of the compromised space is identified (operation 904). The area may be identified from the visual indication device. In addition to being in an area nearby, proximate to, or within some selected distance of the secured area, the visual indication may present information identifying the location of the compromised space.

The identified area is then inspected (operation 906). This inspection may include, for example, looking in the area to determine whether theft, tampering, or some other unauthorized access has occurred. Thereafter, the visual indication device is reset by an authorized and trained person after the inspection has been made (operation 908), with the process then returning to operation 900). This process continues until no more alerts are detected in operation 902. When no more alerts are detected in operation 902, the process terminates.

The reset function in operation 908 may require the use of a special tool, such as a tool only available to authorized inspectors. Alternatively, or in addition, the reset feature may only function while the system is placed in an "inspect" mode by an authorized inspector. All or multiple alerts may be reset from a central location or multiple central locations to simplify normal servicing and maintenance tasks.

Using the process in FIG. 9, the amount of time needed to inspect the cabin of an aircraft may be significantly reduced. This type of inspection may be used for some areas while full inspections still may be performed for others. The use of this type of inspection for any areas within and/or potentially outside of the aircraft may help reduce the amount of time needed to perform all equipment and secure inspections.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

As used herein, the phrase "at least one of" when used with a list of items means that different combinations of one or more items may be used and only one of each item in the list is needed. For example, "at least one of" item A, item B, and item C may include, for example, without limitation, item A, or item A and item B. This example also may include item A, item B, and item C, or item B and item C.

The description of the different advantageous embodiments has been presented for purposes of illustration and description, and is not intended to be exhaustive or limited to the embodiments in the form disclosed. For example, advantageous embodiments may be used in a similar way to monitor the presence or absence of minimum equipment list items, such as, for example, without limitation, items required to be present before flight. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing aircraft security inspections, the method comprising:
   dividing a plurality of aircraft cabin locations into a plurality of secured areas and a plurality of alert areas;
   providing a sensor network connected to a plurality of sensors in the plurality of secured areas and a visual indication device network connected to a plurality of visual indication devices in the plurality of alert areas, each of the plurality of alert areas corresponding to one of the plurality of secured areas, wherein the plurality of secured areas includes a number of aircraft seats and a number of lavatories and the plurality of sensors includes a life vest sensor and a seat cushion sensor in each of the number of aircraft seats, and a toilet shroud sensor, an under sink cabinet sensor, a light bezel sensor, and a vanity cabinet sensor in each of the number of lavatories;
   monitoring the sensor network for an indication of a potential breach of a secured area; and
   identifying the potential breach of the secured area by an indication at a display of the sensor network on the aircraft wherein the display presents an identification of the component for which a breach has been detected and a date and time at which the breach was detected, and a visual signal from one or more of the visual indication devices, wherein a number of visual indication devices corresponding to the life vest sensor and the seat cushion sensor are positioned at an end of a row of seats and visible from an aisle, and wherein the visual indication devices for sensors monitoring the undersink cabinet, the toilet shroud, the light bezel, and the vanity cabinet within one of the number of lavatories are located within a sign for the one of the number of lavatories.

2. The method of claim 1 further comprising:
   responsive to receiving a signal from a sensor, identifying an area in the plurality of alert areas to form an identified area;
   identifying the visual signal of the visual indication device associated with the identified area; and
   responsive to identifying the visual signal, one of an authorized airline service personnel, an authorized inspector, and a ground crew member inspects the area.

3. The method of claim 1 further comprising:
   after completion of a flight, visually inspecting, by one of an authorized airline service personnel, an authorized inspector, and a ground crew member, a plurality of visual indicator devices in the cabin;
   determining whether a new alert has been presented on any of the plurality of visual indication devices; and
   responsive to identifying the new alert, initiating, by the aircrew member, an inspection of a specific area associated with the alert.

4. The method of claim 1, wherein the visual indication device is a light and further comprising:
   initiating a flashing of the light identifying the identified area using one of a sequence of light flashes to locate the identified area.

5. The method of claim 1, wherein the visual indication device is a light and further comprising:
   initiating a flashing of the light having a color that locates the identified area.

6. The method of claim 1, wherein the visual indication device is a monitor located in the cabin and further comprising:
displaying a location of the identified area.

7. The method of clam 1 further comprising: resetting the visual indication device after the alert has been seen.

8. The method of claim 1, wherein the plurality of sensors include at least one of a vanity cabinet door sensor, a compartment door sensor, a toilet shroud sensor, and a life vest sensor.

9. The method of claim 1, wherein the set of sensors is a plurality of wireless sensors.

10. The method of claim 1, wherein the visual indication device is located in the cabin.

11. An aircraft security system for identifying a compromised space in an aircraft, the aircraft security system comprising:
a sensor network capable of monitoring a plurality of secured areas in a cabin of the aircraft;
a display indication device network in communication with the sensor network capable of generating a plurality of visual alerts for a plurality of secured areas within the cabin of the aircraft; and
a data processing system connected to a computer readable memory and to a computer readable storage;
first program instructions for dividing a plurality of aircraft cabin locations into a plurality of secured areas and a plurality of alert areas;
second program instructions for connecting a sensor network to a plurality of sensors in the plurality of secured areas and a visual indication device network connected to a plurality of visual indication devices in the plurality of alert areas, each of the plurality of alert areas corresponding to one of the plurality of secured areas, wherein the plurality of secured areas a number of aircraft seats and a number of lavatories and the plurality of sensors includes a life vest sensor and a seat cushion sensor in each of the number of aircraft seats, and a toilet shroud sensor, an under sink cabinet sensor, a light bezel sensor, and a vanity cabinet sensor in each of the number of lavatories;
third program instructions for monitoring the sensor network for an indication of a potential breach of a secured area; and
fourth program instructions for identifying the potential breach of the secured area by one of an indication at a display of the sensor network on the aircraft and a visual signal from one of the visual indication devices, wherein the display presents an identification of the component for which a breach has been detected and a date and time at which the breach was detected, and a visual signal from one or more of the visual indication devices, wherein a number of visual indication devices corresponding to the life vest sensor and the seat cushion sensor are positioned at an end of a row of seats and visible from an aisle, and wherein the visual indication devices for sensors monitoring the undersink cabinet, the toilet shroud, the light bezel, and the vanity cabinet within one of the number of lavatories are located within a sign for the one of the number of lavatories;
wherein the first, second, third, and fourth program instructions are stored in the computer readable storage for execution via the computer readable memory.

12. The aircraft security system of claim 11, wherein the display indication device network comprises at least one of a light attached to an aircraft seat and the sensor associated with the display indication device network is a life vest sensor.

13. The aircraft security system of claim 11, wherein the visual indication device network is a light and identifies the identified area using a sequence of light flashes to locate the identified area.

14. The aircraft security system of claim 11, wherein the visual indication device network is a light having a color that locates the identified area.

15. The aircraft security system of claim 11, wherein the visual indication device network is a monitor located in the cabin and displays a location of the identified area.

16. The aircraft security system of claim 11, wherein the display indication device network is a display located in a galley.

17. The aircraft security system of claim 11, wherein the visual indication device is located in the cabin.

18. The method of claim 1, wherein the plurality of visual indication devices includes an airplane to ground message alerting a ground crew for a required level of inspection and a replacement equipment.

19. The aircraft security system of claim 11, wherein the plurality of visual indication devices includes an airplane to ground message alerting a ground crew for a required level of inspection and a replacement equipment.

* * * * *